United States Patent
Torrijos et al.

(10) Patent No.: US 7,670,489 B2
(45) Date of Patent: Mar. 2, 2010

(54) METHOD FOR PURIFYING EFFLUENT IN AN ANAEROBIC REACTOR

(75) Inventors: Michel Torrijos, Narbonne (FR); Rene Moletta, Chambery (FR); Joseph V. Thanikal, Tamil Nadu (IN); Nicolas Bernet, Cuxac d'Aude (FR)

(73) Assignee: Institut National de le Recherche Agronomique, Paris (FR)

( * ) Notice: Subject to any disclaimer, the term of this patent is extended or adjusted under 35 U.S.C. 154(b) by 35 days.

(21) Appl. No.: 11/919,481

(22) PCT Filed: Apr. 27, 2006

(86) PCT No.: PCT/FR2006/050392

§ 371 (c)(1),
(2), (4) Date: Jan. 30, 2008

(87) PCT Pub. No.: WO2006/114552

PCT Pub. Date: Nov. 2, 2006

(65) Prior Publication Data

US 2009/0078648 A1  Mar. 26, 2009

(30) Foreign Application Priority Data

Apr. 27, 2005  (FR) .................................. 05 51092

(51) Int. Cl.
*C02F 3/28* (2006.01)
(52) U.S. Cl. .................. 210/603; 210/617; 210/618
(58) Field of Classification Search ................ 210/603, 210/617, 618, 150, 151
See application file for complete search history.

(56) References Cited

U.S. PATENT DOCUMENTS

| 4,043,936 | A | * | 8/1977 | Francis et al. | 210/617 |
| 4,322,296 | A | * | 3/1982 | Fan et al. | 210/618 |
| 5,006,249 | A | * | 4/1991 | Green et al. | 210/617 |
| 5,116,505 | A | * | 5/1992 | Lourens et al. | 210/618 |
| 5,126,042 | A | * | 6/1992 | Malone | 210/618 |
| 5,147,547 | A | * | 9/1992 | Savall et al. | 210/618 |
| 5,750,041 | A | * | 5/1998 | Hirane | 210/618 |
| 6,447,675 | B1 | * | 9/2002 | James | 210/618 |
| 6,709,591 | B1 | * | 3/2004 | Ellis et al. | 210/617 |

FOREIGN PATENT DOCUMENTS

DE 199 29 568 * 9/2000

OTHER PUBLICATIONS

Translation of German publication 199 29 568, Sep. 2000.*

* cited by examiner

*Primary Examiner*—Christopher Upton
(74) *Attorney, Agent, or Firm*—Young & Thompson

(57) ABSTRACT

The invention relates to a method for purifying effluents in an anaerobic reactor (1) in which the micro-organisms are held by supports, the supports forming a bed which is fixed in a part (4, 5) of the reactor. The inventive method is characterized in that it includes a step wherein the reactor is backwashed once it has been at least partially clogged, by temporarily suspending the supports. Advantageously, the method includes an initial step for starting the reactor, during which the load of the reactor is increased with a short and constant hydraulic residence time.

20 Claims, 4 Drawing Sheets

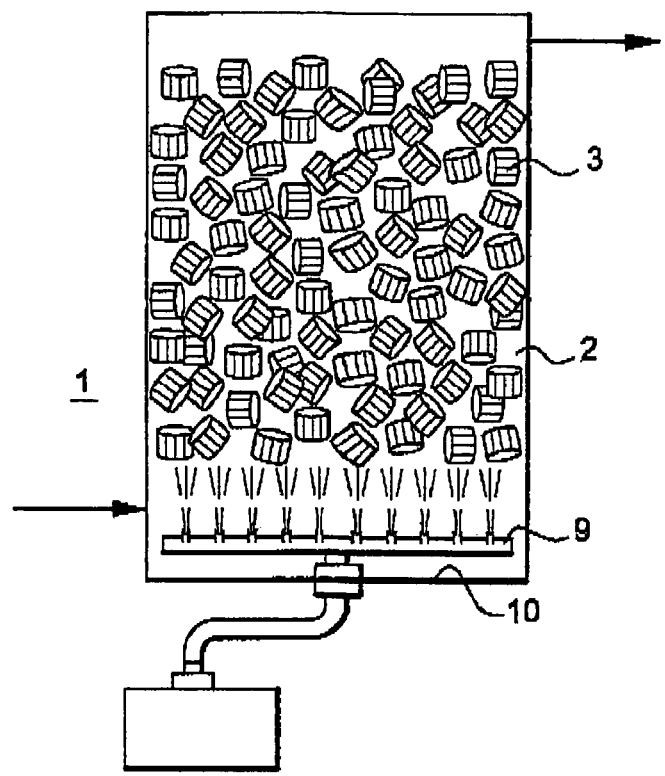
Fig. 3
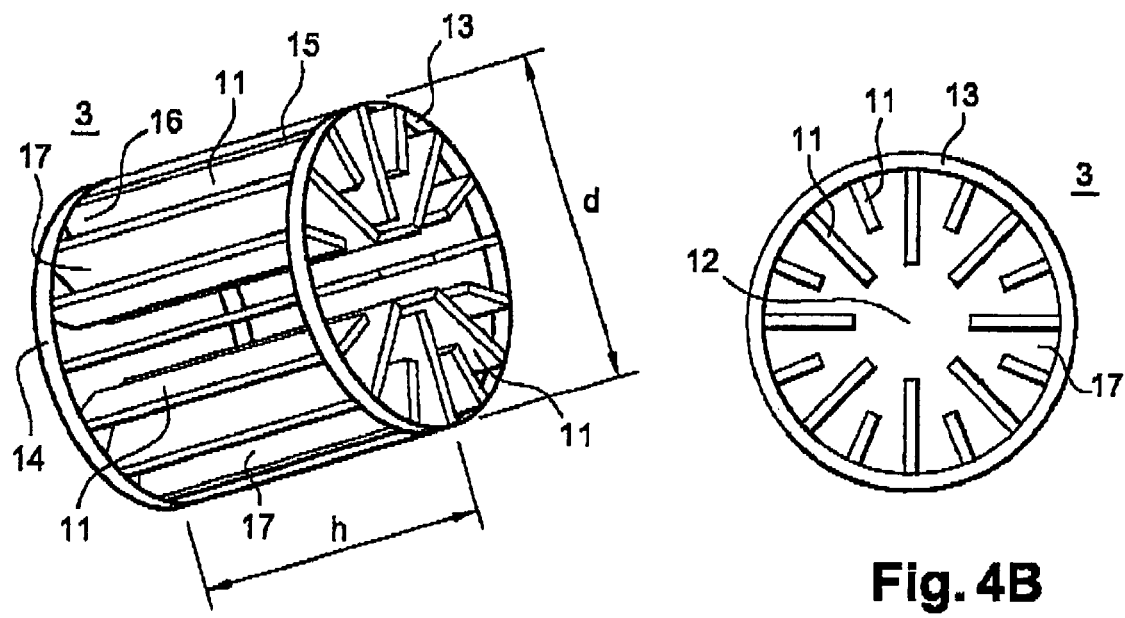
Fig. 4A
Fig. 4B

METHOD FOR PURIFYING EFFLUENT IN AN ANAEROBIC REACTOR

FIELD OF THE INVENTION

The invention relates to a process for purifying effluent in an anaerobic reactor. More specifically, the invention relates to a process for purification in which the microorganisms are attached to solid supports and form a fixed bed, or an anaerobic filter that can be fluidized on demand. The invention also relates to the use of a biological reactor in which the supports that carry the microorganisms are allowed to be organized in a fixed bed during the steady-state operational phase. The supports are suspended only during the initial phase of running the reactor up (start-up phase) or selectively during the steady-state operational phase only once the reactor becomes clogged.

Currently, there are two prominent biological treatment methods of waste water, or effluents, namely aerobic treatments and anaerobic treatments. The invention relates to the purification of the waste water by anaerobic treatment.

BACKGROUND OF THE INVENTION

The use of aerobic reactors for the treatment of heavily burdened waste water involves the production of large amounts of sludge by the microorganisms that have to remove pollution from the waste water. Thus, 50% on average of the pollution that is eliminated in an aerobic reactor is transformed into sludge, which is another form of pollution that should in turn be treated. The aerobic processes are therefore used first for the effluents that are not very heavily polluted. Furthermore, the aerobic reactors require a frequent and extended, energy-consuming aeration.

It is therefore known to use an anaerobic reactor for certain biological treatments of waste water, whose concentration of pollution is high. The pollution that is treated in this type of reactor is primarily transformed into fuel gas, which can subsequently be used for other applications.

Among the advantages of this method for removing pollution from waste water, it is possible to cite the fact that the production of excess sludge is low because the biomass yield, i.e., the kilograms of microorganisms formed per kilogram of COD that is eliminated or supplied is low. Among the drawbacks of this method for removing pollution from waste water, it is possible to cite the fact that the anaerobic microorganisms have a lower growth rate than the aerobic microorganisms and the fact that in a reactor with microorganisms in suspension, it generally is not possible to exceed a microorganism concentration of 15 to 20 g/L. The COD is the chemical oxygen demand, i.e., the amount of oxygen that is necessary to oxidize the entire polluting material chemically, in particular the organic compounds that may or may not be biodegradable.

Also, to obtain a larger amount of microorganisms in the reactor, it is known to use particular supports that are immersed and immobile in the liquid phase and to which the microorganisms are attached. There are two types of supports, the so-called "bulk" supports and the so-called "ordered" supports.

The use of such stationary supports in the reactor makes it possible to keep the biomass in the reactor in the form of biofilm and thus to increase the amount of microorganisms in the reactor, which makes it possible to increase the performance levels of the reactor. Biomass is defined as all the microorganisms that are used to degrade the pollution contained in the effluent. Biofilm is defined as the highly structured cellular formations within which microbial cells that are used to degrade the pollution that is contained in the effluent are encompassed in a complex matrix.

The effluent to be treated circulates through the support from bottom to top (upflow) or from top to bottom (downflow). The effluent is thus in contact with the biomass that initiates the removal of pollution.

The two primary drawbacks of such an anaerobic biological reactor are, on the one hand, as for any anaerobic process, the length of the start-up phase of the reactor, which most often lasts between 3 and 6 months, and, on the other hand, the risk of clogging of the reactor that can bring about, at the end of a more or less long time, a total blocking of the reactor. Actually, although the production of sludge by the microorganisms is less significant in this type of reactor than in aerobic reactors, over time the sludge accumulates on the walls of the supports and in the openings between the supports and cannot be evacuated. The accumulation of the sludge can result in a shutting-off of the reactor by plugging it completely.

In the field of anaerobic treatment of waste water, for example, a biological reactor that uses ordered stationary supports on whose walls the microorganisms are attached is known. The supports are formed by hollow tubes that are attached by one end and in an ordered manner in the tank of the reactor. The tubes have a diameter of 102.5 mm and are divided in their diameter into fourteen channels in which the microorganisms are attached and can thus be organized into biofilm.

Experience shows, however, that with this type of reactor, a gradual clogging unavoidably occurs at the end of several months of operation. Actually, over time, the sludge accumulates on the walls of the columns and cannot be evacuated. This clogging greatly disrupts the operation of the reactor and, at the end, the accumulation of the sludge can result in a shutting-off of the reactor by plugging it completely.

Alternatively, the use of an anaerobic reactor that operates in a fluidized bed, i.e., with permanent movable supports, is known. The microorganisms are attached to supports of very small size that are kept in suspension in the reactor. The supports are movable in the reactor and rub against one another and/or with the inside walls of the tank of the reactor, tearing the biofilm that is formed by the microorganisms as soon as it exceeds a certain thickness. The sludge falls into the bottom of the tank where it can be purged or exists with the treated effluent. There is thus no risk of the reactor clogging since the accumulation of the sludge at the supports is rendered almost impossible. The permanent or quasi-permanent mobility of the supports is obtained by the creation of permanent or quasi-permanent turbulence in the reactor.

As for drawbacks, however, such a reactor, on the one hand, consumes an enormous amount of energy to keep the supports permanently in suspension and, on the other hand, requires an intensive support of the installation.

SUMMARY OF THE INVENTION

One object of the invention is to treat effluents by a biological treatment in an anaerobic medium so as to eliminate a large portion of the pollution that they contain with excellent performance levels, without the danger of clogging the reactor, with low costs and a short running time, and with a large reduction of the duration of the initial phase of running the reactor up (start-up phase). Run-up is the gradual increase in the loading rate during the time following the seeding of the reactor, until the nominal load that was set during the sizing of the reactor is reached. Another object of the invention is to allow the treatment of all types of effluents, including effluents that are heavily burdened by pollution. An additional object of the invention is to promote the growth of the biomass in the reactor. The invention also has as its object to provide a solution for the treatment of effluents, which is easily usable directly by the polluting industries.

For this purpose, the invention proposes treating waste water from which pollution is to be removed in an anaerobic reactor in a fixed bed, which can be made movable according to the requirements of the users, during the start-up phase or the backwashing phase of the reactor, so as to optimize its operation. The fixed-bed operation involves low costs and a great simplicity of production. The fixed bed is formed by a number of supports that are arranged in bulk in the reactor and on which the microorganisms form a biofilm and accumulate in the supports and in the openings created between the supports.

In a first step and during the start-up phase of the reactor (run-up), the growth of the biofilm on the supports is promoted by maintaining dwell times that are short. The frequent fluidization of the supports can also promote the formation of biofilm. The desired object is to reduce the duration of the run-up phase by eliminating the free bacteria from the reactor to force attachment to the supports.

In a second step (steady-state operational phase), the reactor operates in a fixed-bed at its nominal load. The retention of interstitial biomass is then promoted. Interstitial retention is defined as the accumulation of the biomass in the openings of the supports and between the supports. The fluidization device is no longer used, and the reactor operates in a pure fixed bed.

This is the way, on the one hand, to run up to a heavy load in a short time, most often less than one month, and, on the other hand, to achieve very large loads for a fixed bed, i.e., that can go up to 45 kg of COD/m3.day.

As the fixed bed of the reactor is used for the treatment of waste water, sludge accumulates on and in the interior and between the supports and begins to clog the reactor. When the reactor is at least partially clogged, it is provided according to the invention to fluidize the supports. The fluidization is temporary and is spread over a short time, i.e., on the order of several minutes or several hours. During the fluidization, the mobility of the supports allows friction that is sufficient to make sludge drop into the bottom of the tank. Surplus sludge can then be drawn off from the tank in the conventional manner. The fluidization is then stopped. The supports become immobile again in the reactor so as to again form a fixed bed. The time that passes between two fluidizations can be relatively long, on the order of several months to several years, according to the type of supports and the loading rate. By backwashing the reactor only once it is partially clogged, the biomass is not disrupted and the risks of blocking the reactor that could make it unusable are eliminated.

The invention therefore has as its object a process for purification of an effluent in an anaerobic reactor in which the microorganisms are retained by supports, whereby the supports form a fixed bed in a portion of the reactor, characterized in that it comprises the step of temporarily suspending supports in the entire reactor either during the start-up phase to eliminate the free microorganisms or the microorganisms that are trapped in or between the supports, or, during the steady-state operational phase, to initiate a backwashing of the reactor once it is at least partially clogged.

Purification is defined as the at least partial elimination of the pollution that is contained in the effluent at the moment of penetrating the reactor.

The suspension consists in making the initially immobile supports movable in the reactor. The supports can then be distributed in the entire volume of the reactor and be moved there. The suspension is only temporary to the extent where, as soon as the backwashing ends, the supports are reorganized in a fixed bed.

Whereas the principle of the invention suggested to specialists performance levels close to those of the conventional fixed beds, i.e., a maximum volumetric load of 15 to 20 kg of $COD/m^3$. day with a purification yield of 80%, they noted with astonishment that the process according to the invention makes it possible to achieve performance levels in terms of loading rate that are more than 2× greater than those obtained with conventional fixed beds with values of 46 kg of $COD/m^3$.day while having a purification yield of more than 80%. In addition, the run-up is carried out quickly in this manner.

The effluent purification process according to the invention comprises the following stages:
a) Running the reactor up with a hydraulic dwell time (HDT) of less than 48 hours;
b) Purifying the effluent by holding the supports in a fixed bed;
c) Fluidizing the reactor once it becomes at least partially clogged by temporary suspension of the supports.

Running the reactor up is defined as the initiation phase of the reactor, during which the loading rate is smoothly increased up to the nominal design load and where the object is for biofilm to form on the supports. For example, a run-up of the reactor up to 20 kg of COD/m3.day, +/−10% is achieved.

This run-up stage is characterized by a gradual increase of the COD of the effluent that moves into the reactor, with a short hydraulic dwell time during the entire run-up stage so as to increase the loading rate of the reactor. Preferably, the COD of the effluent to be treated, and therefore the loading rate, is increased every day by a constant percentage that is between 5 and 15%. For example, the daily increase can be 10% of the preceding value.

Once the desired organic loading rate (OLR) is obtained, i.e., at the end of stage a), the reactor can be used in a fixed bed for purifying in an optimum way the effluents to be treated. Of course, the reactor is already operational during the entire stage a), but it is not considered to be operating under the nominal conditions as defined during the sizing of the reactor.

Loading rate is defined as the amount of pollution that is treated in the reactor per cubic meter of reactor (organic loading rate) or per gram of biomass (mass loading rate) and per day.

According to sample embodiments of the process according to the invention, it is possible to provide all or part of the following additional characteristics:
In stage a), the HDT is constant;
In stage a), the HDT is between 12 and 36 hours, preferably between 20 and 30 hours, and even more preferably between 22 and 26 hours, even preferably equal to 24 hours,
Stage a) lasts for 35 days, plus or minus 5 days,
During stage a), the supports are suspended at least once; for example, the supports are temporarily suspended for 10 minutes, +/−2 minutes, every hour; it is also possible to provide a continuous suspension for the entire stage a).

This smooth fluidization of the supports promotes the attachment of the biomass to the supports, i.e., the formation of biofilm, by making possible the washing and the elimination of the biomass that is free or simply accumulated in the openings. Actually, under these conditions, only the biomass that is attached physically to the supports in the form of biofilm can remain on said supports during the fluidization. The biomass that is accumulated/retained in the openings is itself eliminated in the same way as the biomass in suspension.

Stage b) lasts between 2 and 12 months, preferably between 6 and 9 months, even more preferably 8 months. More generally, the purification stage b) is extended as long as the reactor is not clogged and as long as the purification yield, for an organic loading rate (OLR) that corresponds to the nominal load, is satisfactory. Preferably, it is considered that the purification yield is satisfactory as soon as it is at least equal to 80%. As soon as the purification yield decreases beyond a threshold value, set by the user, backwashing is initiated. For example, the threshold value is set at 75% of the purification yield.

The backwashing stage c) lasts between 15 minutes and 1 hour, plus or minus 10 minutes. Once the reactor is backwashed, the suspension of the supports is stopped so that they are reorganized in a fixed bed. It is then possible to again initiate the purification of the effluents according to stage b) and so on.

In a particular sample embodiment of the process according to the invention, it is possible to use supports that have a density that is less than the density of the liquid that is contained in the reactor, such that they form a fixed bed in the upper portion of the reactor. Conversely, it is possible to use supports that have a density that is higher than the density of the liquid that is contained in the reactor, such that they form a fixed bed in the lower portion of the reactor.

Advantageously, the supports include attachment zones to which the microorganisms can be attached, whereby the attachment zones are arranged so as to allow physical retention of said microorganisms. The physical retention of the biomass is thus made possible by trapping inside said supports. For example, the attachment zones comprise flanges. The microorganisms can then be attached to said flanges and form a biofilm, and/or they can be retained in the openings between the flanges and/or between the supports, in which they accumulate.

These supports are preferably made of extruded or molded material that is equipped with inside flanges that are protected from the turbulence that can exist within the reactor, whereby said inside flanges have a large attachment surface for the microorganisms. These supports make it possible to attach the biomass to a large surface but in addition to keep the biomass within the openings between the flanges and between the supports themselves.

The means for fluidizing the supports can be located in a portion of the reactor that lacks a fixed bed. Likewise, means for supplying the tank of the reactor with effluent can be located in the portion of the reactor that lacks a fixed bed. It is also possible to provide homogenization means there that make it possible to spread the effluent within the entire reactor.

Advantageously, the supports occupy between 40% and 80% of the volume of the reactor and preferably between 50% and 70%.

The more numerous the supports are within the reactor, the larger the biomass may be and therefore the larger the load will be.

It is necessary, however, that there be enough space in the reactor between the fixed bed and at least one wall, lower or upper, of the reactor so as to allow a resuspension on demand of said supports in the entire volume of the reactor. Resuspension or fluidization of the supports is defined as the supports being disrupted, the fixed bed broken, such that all of the supports are movable within the reactor. The backwashing of the reactor is thus made possible.

The fluidization can be obtained by actuating a fluidization system, such as a pump, that can create turbulence within the reactor, so as to suspend the supports.

It may be advantageous to use a reactor in which the fluidization system is removable and external to the reactor, whereby said fluidization system is branched at least temporarily in ducts to carry out the backwashing. By external fluidization system, it is necessary to understand that the fluidization system is not immersed in the volume of the reactor but is located on the outside. The fluidization system is therefore not in contact with the effluent and the supports. This facilitates in particular the maintaining of the fluidization system, which is thereby easily accessible.

In addition, it is possible to use the same fluidization system for the backwashing of several reactors. Actually, to the extent according to the process of the invention, the backwashing is carried out only rarely, and during a short time, the same fluidization system can be used for alternatively backwashing different reactors.

The fluidization of the steady-state operational supports, i.e., outside of the initialization stage, is carried out only once the reactor is clogged. The time that is necessary for the clogging can vary from reactor to the next, based on in particular the type and the amount of supports, the amount of biomass in the reactor and the loading rate.

In a general manner, it is possible to adjust the backwashing period as well as the backwashing time so as take into account the quality of the supports and/or the amount of biomass and/or the loading rate.

The backwashing can be periodic, with a period that goes from several days to several years depending on the requirements. In particular embodiments, it is possible to initiate backwashing once per year, or every two years, three years, etc. The backwashing can also take place in an irregular manner, each time that the reactor is more or less clogged and that the user desires to backwash it.

So as to ascertain the clogging level of the reactor and therefore to be able to backwash it as a result, it is possible to provide a system for detecting the clogging level in the reactor, which measures, for example, pressure drops in the reactor.

The supports are reorganized in a fixed bed between two successive backwashings.

The invention also proposes a use of a biological reactor that comprises microorganisms that are held on supports and fluidization means that can suspend the supports, characterized in that the reactor is used for the purification of an effluent by anaerobic treatment, whereby the fluidization means are used temporarily so as to backwash the reactor, whereby the supports are immobile and form a fixed bed in the reactor when the fluidization means are not used.

For the use according to the invention, the supports occupy, for example, 40% to 80% of the volume of the reactor, and preferably 50% to 70%, such that when the temporary fluidization means are used, the supports can be distributed throughout the volume of the reactor because of the suspension of said supports that makes it possible for them to be movable within the volume of the reactor.

The supports that are used are made of, for example, extruded or molded material and are equipped with flanges, whereby the microorganisms are attached to said flanges and/or kept within openings between the flanges and/or between the supports.

In a particular embodiment of the invention, the fluidization means of the biological reactor that is used comprise a fluidization system that can create turbulence within the reactor to suspend the supports.

The fluidization system is, for example, a pump. The pump can be a water pump or a biogas pump.

In another sample embodiment, the fluidization system comprises a reserve of inert gas, such as a nitrogen bottle, starting from which the pressurized gas is injected into the reactor.

The fluidization system can be located outside or inside the reactor. In the case where the fluidization system comprises an external pump, said fluidization system also comprises at least one duct, whereby said duct empties into the interior of the reactor.

In another sample embodiment of the invention, it is possible to create turbulence mechanically, i.e., by mechanical stirring or by any known means.

BRIEF DESCRIPTION OF THE DRAWINGS

The invention will be better understood from reading the following description and from examining the figures that accompany it. The latter are presented by way of indication and in no way limit the invention. The figures show:

FIG. 3: A representation of the biological reactor according to FIG. 2, in which the supports are fluidized;

FIGS. 4A and 4B: A diagrammatical representation of a support for attachment of the biomass, seen from the side (FIG. 4A) and seen from the top (FIG. 4B);

DETAILED DESCRIPTION OF EMBODIMENTS

Figure 1:
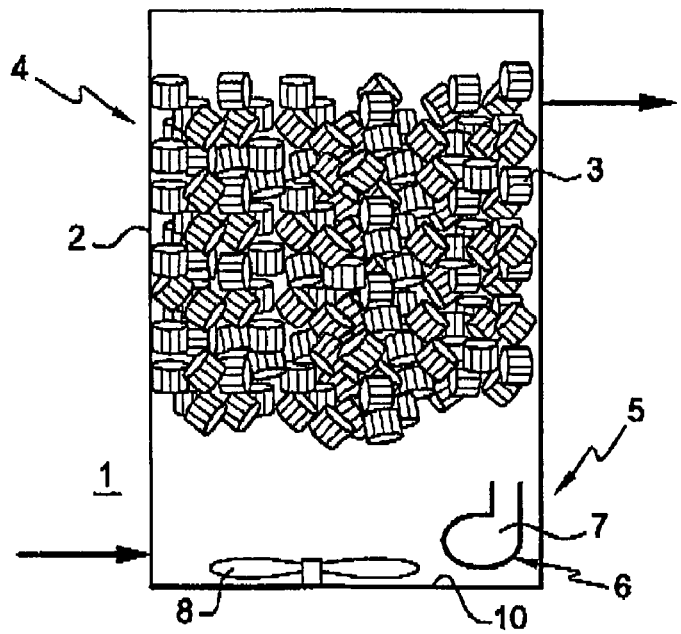
FIG. 1: An example of a biological reactor that can be used for treating effluents according to the invention.

FIG. 1 shows a biological reactor 1 that can operate anaerobically. The reactor 1 comprises a tank 2 in which a number of solid supports 3 are used in bulk. In the case that is shown, the supports 3 have a density that is considerably less than the density of the water such that all the supports are concentrated in an upper portion 4 of the tank 2 of the reactor 1. The density of the supports is encompassed, for example, between 0.90 and 1.2.

A support example 3 that can be used in the reactor 1 is shown in FIGS. 4A and 4B. The support 3 is generally circular-cylindrical in shape with a height h of about 3 cm and a diameter d of between 2.5 and 3.5 cm. Height h is defined as the dimension of the support 3 in the direction that is parallel to the longitudinal axis of the support. The support 3 is equipped with a number of rigid flanges 11 that are directed toward the center 12 of the support 3. The flanges 11 are all attached by a first end 15 to a first rigid ring 13 and by a second end 16 to a second rigid ring 14. The flanges 11 form the body of the support 3. The flanges 11 are separated from one another so as to provide a space 17 through which the effluent, or the liquid in general, can pass, so as to be in contact with the portion of the flanges 11 that is directed toward the center 12 of the support 3.

It is possible, of course, to use all sorts of other supports 3 to attach the microorganisms.

Preferably, the supports 3 that are used are supports of macroscopic size, of height h that is between 15 mm and 50 mm, and a diameter of between 10 mm and 50 mm.

Internal fluidization means 6 are located in the lower portion 5 of the tank 2, lacking supports 3, i.e., housed completely in the tank 2. The fluidization means 6 comprise a pump 7 that can blow in a gas or a liquid into the tank 2. The pump 7 can be actuated and stopped on demand.

The lower portion 5 of the tank 2 of the reactor 1 also comprises homogenization means 8. The homogenization means 8 comprise, for example, a turbine that is equipped with blades so as to stir the effluent that penetrates the tank 2 at the lower portions of said tank 2.

Such homogenization means 8 can be particularly advantageous when the reactor 1 is used to treat heavily burdened effluents that otherwise could remain concentrated locally in the lower portion 5 of the tank 2.

With the homogenization means 8, the effluent is mixed with the remainder of the fluid that is contained in the tank 2. The effluent thus passes through the upper portion 4 of the tank 2 that contains the fixed bed that is formed by the supports 3.

A grid that is located at the outlet of the liquid prevents the supports 3 from escaping from the tank 2 via the outlet duct of the tank (not shown) via which the treated effluent is evacuated.

It is also possible to provide a grid (not shown) at the lower portion 5 of the reactor 1 to protect the fluidization means 6 and the homogenization means 8. The grid then makes it possible to avoid any contact between the fluidization means and the supports 3. Thus, even if certain supports 3 fall to the bottom 10 of the tank 2, for example when the amount of microorganisms attached to the supports is such that the total density is more than that of water, said supports 3 neither can be damaged by the fluidization means nor can damage the latter.

It is possible, in another sample embodiment, to use supports 3 that have a density of more than the density of water, such that the fixed bed that is formed by the supports 3 is located in the lower portion 5 of the tank 2. The effluent then penetrates the tank 2 at the upper portion 4, or the low portion 5, which can also comprise homogenization means 8 and fluidization means 7.

In another sample embodiment, the fluidization means 6 can be located in the portion of the reactor 1 that comprises the fixed bed.

Figure 2:
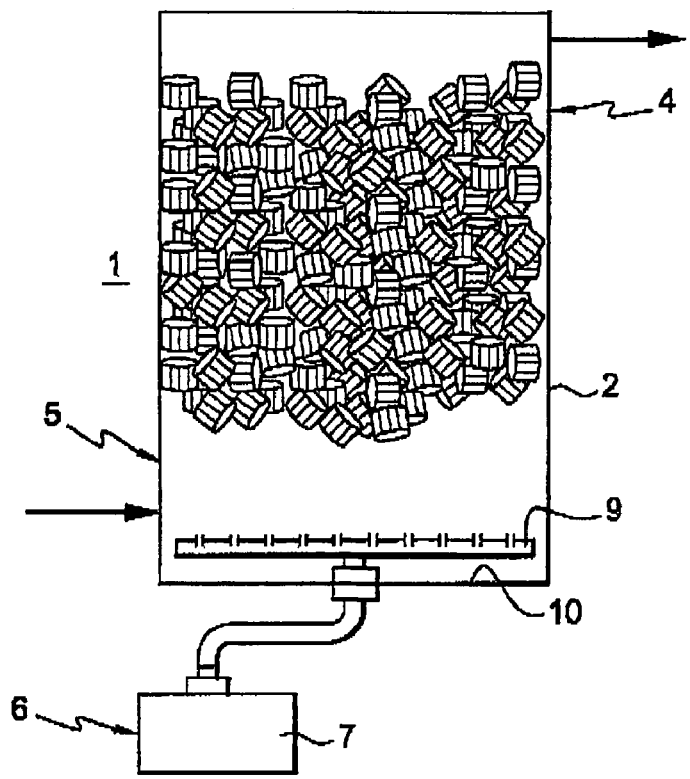
FIG. 2: A second example of a biological reactor that can be used for the treatment of effluents according to the invention.

In the example that is shown in FIG. 2, the fluidization means 6 are only partially internal. The fluidization means 6 comprise a pump 7 that is external to the tank 2 and an internal duct system 9. The pump 7 is branched in the duct system 9 that is located inside the tank 2. The duct system 9 comprises a number of ducts that are distributed in the bottom 10 of the tank 2. It is possible, of course, to provide only one duct in the duct system 9. The external pump 7 can be a removable pump. Thus, it is possible to branch the pump 7 to the duct system 9 in a temporary way when the user desires to create turbulence in the tank 2.

In FIG. 3, it is possible to see the biological reactor 1 in which the fluidization means 6 have been activated. The pump 7 blows in a liquid or a gas into the tank 2, such that turbulence is created. The turbulence is sufficient to disrupt the fixed bed of supports 3. The supports 3 are all found suspended in the entire volume of the tank 2, which is in motion in said tank 2. Thus, the surplus sludge accumulated in the supports 3 can drop into the bottom 10 of the tank, where it can easily be evacuated.

When the pump 7 is deactivated, i.e., stopped, the turbulence ceases. Owing to their density, the supports 3 then all rise toward the upper portion 4 of the tank 2 of the reactor 1 where they become immobilized for forming a fixed bed again.

One of the drawbacks that is associated with anaerobic reactors is that the time that is necessary for the run-up of such a reactor is very long, since it most often takes between three and six months. For this run-up period, the loading rates of the reactor are low because of the low concentration of biomass. It therefore is not possible to apply right away the maximum load that is defined during the design of the installation to such an anaerobic reactor. A run-up phase, characterized by a gradual increase in the loading rate of the reactor, is necessary.

In the invention, it is desired to reduce the duration of the run-up phase in the anaerobic reactor that is used according to the invention. For this purpose, experiments have been conducted whose results are shown in FIG. 7.

These experiments have demonstrated that if the organic loading rate is increased gradually in the reactor by maintaining a short hydraulic dwell time, a large run-up is achieved in very little time. With a dwell time of one day, the COD concentration of the effluent to be treated in kg/m$^3$ is equal to the organic loading rate in kg/m$^3$.day.

The decoupling of loading rate/hydraulic dwell time is carried out by initially reducing the COD concentration in the input effluent, i.e., by diluting the latter by increasing it gradually until reaching the COD concentration of the raw effluent to be treated. The COD of the effluent to be treated is preferably increased every day by a constant percentage that is encompassed between 5 and 15%.

Figure 7:
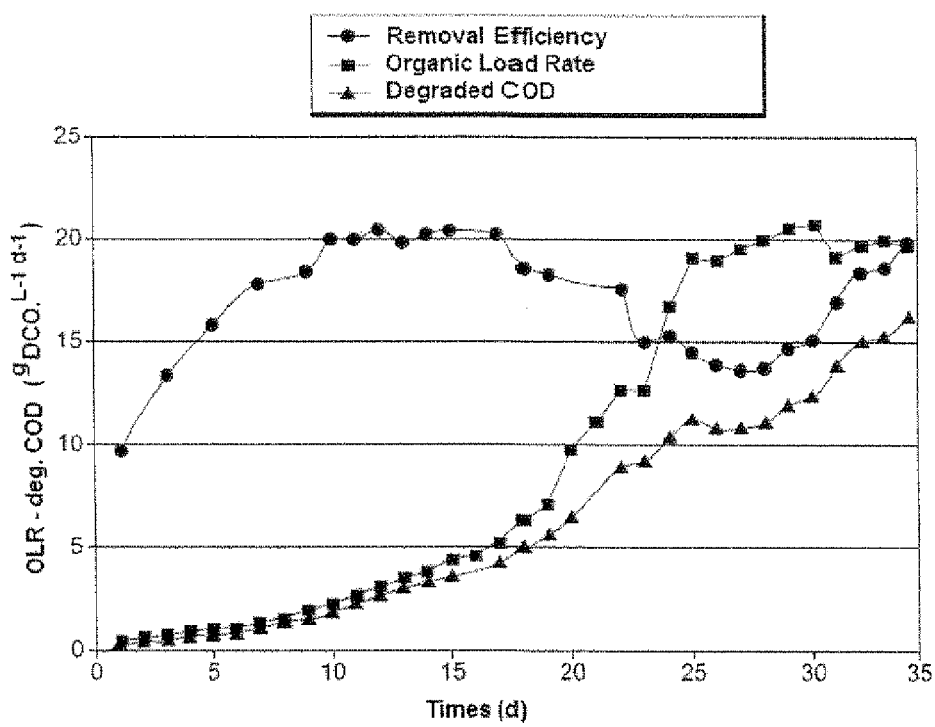
FIG. 7: A graphic representation of the run-up in a reactor that is used according to the invention.

For example, as is shown in FIG. 7, the COD concentration of the effluent is increased by about 10% every day, which makes it possible to pass from a COD of the supply of 0.5 to 20 kg/m$^3$ in 35 days. Whereby the HDT, being 24 hours, lasts for these 35 days, an organic loading rate of 20 kg/m$^3$.day is obtained from the end of this period while maintaining a purification yield of 80%. The reactor is then able to operate, after only 35 days, under the nominal conditions that are defined during the sizing.

In the example that is shown in FIG. 7, the hydraulic dwell time is constant. Of course, it is possible to maintain a dwell time that is short, preferably less than 48 hours, and variable. For example, during the first 10 days of the run-up stage, an HDT of 24 hours is maintained, then, for the next 10 days, an HDT of 36 hours is maintained, then the HDT is dropped back to 30 hours until the 35$^{th}$ day.

During the use of the purification process according to the invention, the loading rate can be increased until being most often greater than or equal to 45 kg of COD/m$^3$.day, based on the effluent to be treated, while effectively eliminating more than 80% of the pollution that is contained in the effluent.

Advantageously, during this run-up phase, so as to promote the growth of the biomass that is attached to the supports in the form of biofilm rather than the accumulated biomass, retained in the openings or on the supports without being actually lodged there, it is possible to initiate a frequent fluidization of the supports. Preferably, the fluidization is temporary, whereby the supports are reorganized in the fixed bed between each fluidization. It is also possible to keep the supports in suspension during the entire run-up stage. The reactor then operates in a fluidized bed during this stage. However, to the extent that such a continuous fluidized-bed operation requires large amounts of energy, it is preferred to fluidize frequently, for example every hour, but temporarily, for example less than 15 minutes. The development of a biofilm on the surface of the support makes it possible to accumulate microorganisms in the reactor that have a very high activity, which makes a quick run-up possible even if the amount of biomass in the reactor is not very high.

Once the run-up phase is ended, the accumulation of biomass is not detrimental to the operation of the reactor and, on the contrary, will make it possible also to increase the amount of microorganisms in the reactor, which makes it possible also to increase the loading rate in steady-state operation. It therefore is no longer necessary to initiate frequent fluidizations. On the contrary, the reactor is kept in a fixed bed to promote the accumulation of the biomass, in the form of biofilm and its accumulation in the interstitial form and inside the supports. The major advantage of the fixed-bed passage at the end of the start-up phase is to optimize the energy costs by stopping the fluidization pump, as well as to reduce the time that is necessary for the monitoring of the reactor. In addition, the fixed-bed operation makes it possible to ensure the filtration of the effluent and a good retention of the solid particles in the reactor thanks to the filtering effect of the supports.

This strategy makes possible a considerably accelerated run-up relative to the conventional strategy, in which most often the gradual increase of the OLR is associated with the proportional reduction of the HDT, without diluting the supply.

Thus, to increase the performance levels of the anaerobic reactor used according to the invention, it is possible to break down the purification process according to the invention into two primary phases, namely:

A first run-up phase, between t0 and t+1 month, for example, during which the attachment of the biomass to the supports in the form of biofilm and washing of the free biomass and the interstitial biomass are promoted. For this purpose, the HDT is low, and the COD is gradually increased.

A second steady-state operational phase, between t+1 month and t∞, during which the reactor operates in a fixed bed, with, in a very separated way, backwashing of the supports to evacuate the excess biomass. During this second phase, the retention is promoted by accumulation of the biomass in the openings of the supports.

A sample use of the reactor 1 that is described above is now being studied in more detail.

Equipment and Method

A reactor that comprises a cylindrical PVC tank is used. The inside diameter of the tank is from about 190 mm for a height of 1150 mm. Height is defined as the largest dimension of the tank, parallel to the longitudinal axis of said tank. This reactor has a useful volume of about 30 liters.

The reactor is equipped with heating means that make it possible to keep the inside of the tank to a temperature of about 35° C.

A feed pipe makes it possible to bring the effluent to be treated inside the tank, at the lower portion of said tank. An evacuating pipe, located in the upper portion of the tank, makes it possible to evacuate the treated effluent. Such an overflow system makes it possible to keep the liquid level to a height of 1000 mm in the tank.

The tank of the reactor contains polyethylene supports in the tubular-cylindrical general form. The supports fill about 60% of the volume of the tank. These supports have a density that is approximately equal to 0.93 and a specific surface area of 320 m²/m³. Specific surface area is defined as the surface on which the microorganisms can be lodged to form a biofilm. The supports that are used are large in size relative to the supports that are usually used in a moving bed, and relatively small in size relative to the supports that are usually used in a fixed bed. More specifically, the supports that are used have dimensions of about 30 to 35 mm in height for about 29 mm of diameter.

So as to be able to fluidize on demand the organized fixed-bed supports in the reactor, the reactor is equipped with an internal pump, attached to the bottom of the tank so as to be immersed in the liquid that is contained in the tank. The inside pump constitutes the fluidization means, i.e., the backwashing of the reactor. The flow rate of the pump is from about 480 L/h.

The effluent to be treated is the cheap distillery wine of which a total COD is between 10 and 24 g/L with a soluble COD of between 10 and 19 g/L. The initial pH of the effluent is between 4 and 5.5. Initial pH is defined as the pH of the effluent at the time of being introduced into the tank of the reactor. Before pollution-removal treatment in the reactor, the pH is brought to a neutral pH, i.e., about 7.

The anaerobic inoculate is obtained from another anaerobic reactor that is used to treat the cheap distillery wine and that was concentrated by decanting. Inoculate is defined as bacteria groups used to inoculate the tank of the reactor.

Backwashing was carried out at the end of 101 days of use, by activation of the pump for 15 minutes.

Measurements

So as to analyze the performance levels of the reactor and the pollution-removing quality of the effluent, the changes in the amount of biomass on the supports as well as the changes in the soluble COD are measured.

The amount of biomass on the supports is determined by measurement of the dry weight of the supports previously heated to 100° C. for 24 hours.

The COD is measured conventionally by a calorimetric method (Jirka, 1975).

Observations of the Operation of the Reactor.

In a first step, so as to initialize the process for treating the effluent, the reactor is activated so that the period during which the effluent to be treated stays in the reactor, i.e., the hydraulic retention time (HRT), is increased, and the organic loading rate (OLR), i.e., the amount of pollution that is introduced into the reactor, per m³ of the reactor and per day, is low. Then, the HRT was gradually reduced while the OLR was increased, by increasing the volume of cheap distillery wine introduced into the reactor.

The reactor was used for 180 days.

So that the reactor is considered to be high-performing, it is estimated that the HRT is to be as small as possible and the OLR as large as possible.

Figure 5:
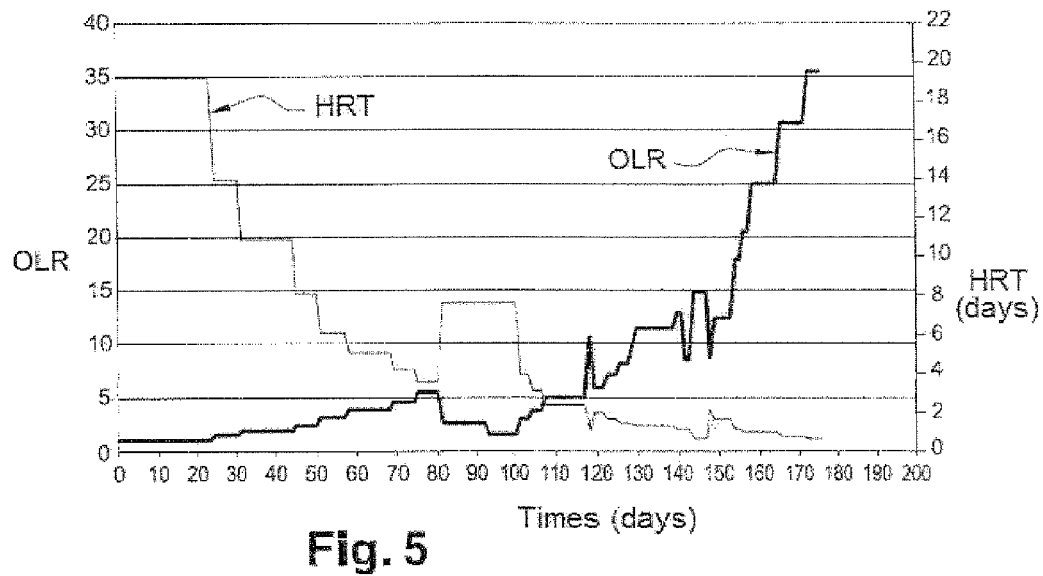
FIG. 5: A graphic representation of the changes in the hydraulic retention time (HRT) and the amount of pollution (OLR) that is introduced in the reactor in a sample embodiment of the treatment according to the invention.

A graph that shows the changes in the HRT and the OLR over time in the reactor that is used is shown in FIG. 5.

During a first period, encompassed between day 1 and day 81, the OLR is low and remains less than 5.6 g of COD/L.day. The HRT decreases quickly and passes from 35 days to day 1, with 5 days, to day 81.

During a second period, encompassed between day 82 and day 101, the HRT increases slightly. The mean value of the HRT is 7.7 days because of inadequate availability of cheap distillery wine. By the same token, the OLR experiences a slight drop and is between 1.6 and 2.6 g of COD/L.day.

In a third period, encompassed between day 102 and day 180, the HRT decreases quickly to reach a minimum dwell time of 0.7 day. Conversely, the OLR increases very quickly to reach values going up to 36 g of COD/L.day.

By way of comparison, under identical conditions, a fixed-bed anaerobic reactor that contains an ordered support such as Cloisonyle has a much lower OLR that does not exceed 14 g of COD/L.day.

Analyses and Results

The first operational period constitutes the start-up phase of the reactor and small loads are applied to prevent any organic overload and to allow the biomass to accumulate in the reactor. During this first purification period, the purification yield is more than 85%.

During the third operating period, which is representative of the optimum operation of the reactor, the dwell time is close to 0.7 day, and the loading rate is 30 g of COD/L.day to eliminate more than 85% of the pollution of the effluent, whereby the soluble COD at the outlet of the reactor is less than 5.5 g/L.

Figure 6A:
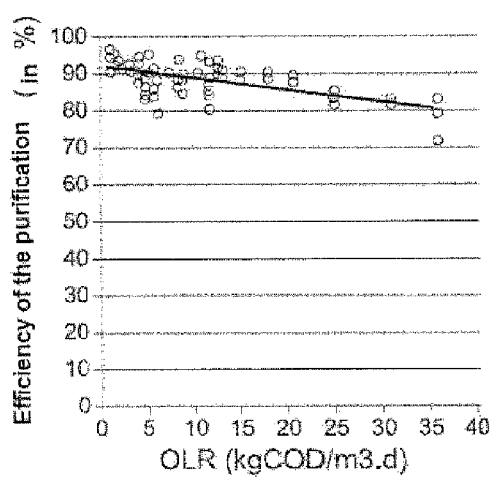
FIGS. 6A and 6B: Graphic representations of the changes in the effectiveness of the purification process of an effluent based on the hydraulic retention time (HRT) and the amount of pollution (OLR) that is introduced into the reactor.
Figure 6B:
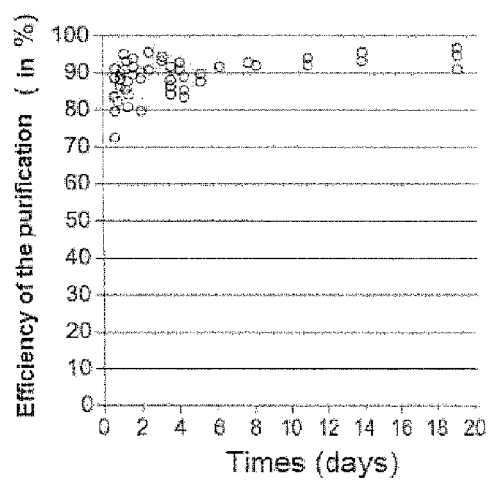

In the graphs of FIGS. 6A and 6B, it is possible to see the changes in the capacity for the removal of pollution from the reactor. These graphs clearly show that with the process according to the invention, it is possible to eliminate more than 80% of the pollution from a heavily burdened effluent, such as the cheap distillery wine, with a loading rate of at least 30 g of COD/L.day and a dwell time within the reactor of less than 1 day.

Changes in the Amount of Biomass Attached to the Supports

Samples of the four supports are regularly taken in the tank of the reactor and dried for 24 hours at 100° C. The samples are then weighed to evaluate the amount of biomass that is present on the supports.

The first sample is taken after 66 days of operation of the reactor, i.e., during the first period of operation. The mean amount of biomass is 2.5 g per support.

The second sample is taken after 156 days of operation of the reactor, i.e., during the second period of operation. The mean amount of biomass is then 3.2 g per support. The biomass has therefore increased by 30% between day 66 and day 156.

The third sample was taken after 180 days, i.e., at the end of the third period of operation. The mean amount of biomass is 4.5 g per support. After 180 days of use of the reactor, the total concentration of biomass attached to the supports in the reactor is about 57 g/L of the reactor.

The biomass therefore satisfactorily increases in the reactor. This is explained by the large specific surface area on the supports that are used and by the fact that the supports are organized in a fixed bed, which makes it possible for the biomass to be attached to the supports and to accumulate in the openings without a disruptive event. Relative to a reactor in which the microorganisms are free within the volume of the reactor, the microorganism concentration is 5 to 6 times higher with a specific activity that is maintained. Specific activity is defined as the amount of COD that can be eliminated per kilogram of biomass. It is thereby expected that the performance levels for removing pollution from the reactor are superior.

Performance Levels of the Reactor

The loading rate in the purification process according to the invention is more than 30 g of COD/L.day, while effectively eliminating more than 80% of the pollution that is contained in the effluent. In a general manner, by way of comparison, the activity that is conventionally measured in an anaerobic reactor with a fixed bed without any possible backwashing is about 15 g of COD/L.day.

The performance levels of the reactor that is used in the invention are directly linked to the capacity of the microorganisms to be attached to the supports and to the absence of turbulence within said reactor. The fact of allowing the reactor to become clogged therefore makes it possible for the biomass to increase in an optimum manner. The backwashing, which takes place on demand, for example only once the user considers the clogging to have reached the point of being detrimental, makes it possible to increase the period of operation of the reactor and to maintain its performance levels during the entire time it is used.

So as to best determine the performance levels associated with the specificities of the support selected during the implementation of the process according to the invention, experiments have been conducted by using different supports equipped with flanges, such that the microorganisms can be attached physically to said flanges and/or be retained in the openings between the flanges and/or between the supports.

During these experiments, three inert supports R1, R2 and R3 have been used, having different specific surface areas, respectively 310, 320 and 855 $m^2/m^3$.

Each of the three supports R1, R2 and R3 is consistent with the support 3 as shown in FIG. 4A. Thus, the supports R1, R2 and R3 can be covered by biofilms that are attached to said supports, but can also accumulate biomass in the orifices and openings 17 made between the flanges 11 and in the center 12 of said supports.

Figure 8:
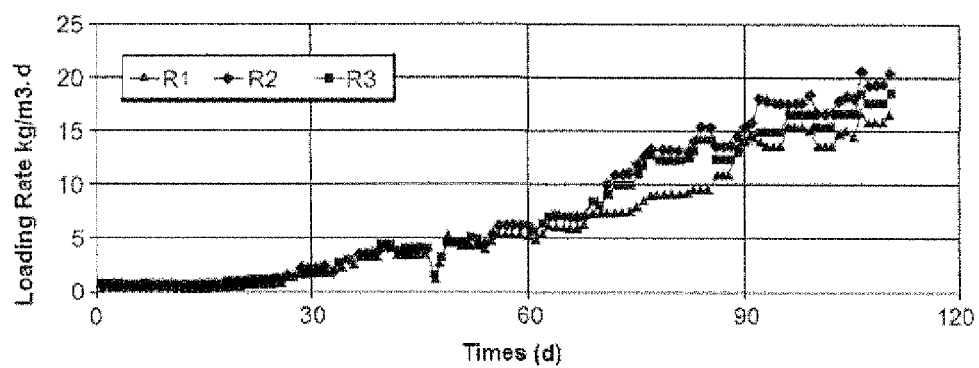
FIG. 8: A graphic representation of the changes in the loading rates in a reactor based on the supports that are used.

The results, shown in FIG. 8, show that the performance levels that are obtained with the three supports R1, R2 and R3 are close. High loading rates, on the order of 20 kg of COD/$m^3$.day, were obtained after quite similar operating times, namely about 110 days.

It is deduced that the operation of the purification process according to the invention during the purification stage in a fixed bed seems to be based both on the filtering effect of the supports that are used, which trap the biomass in their openings, and on the formation of biofilm by physical attachment of the biomass on said supports. Actually, if the only biofilm was responsible for treatment, the organic load would have a tendency to be proportional to the specific surface area.

This makes it possible to explain the surprising performance levels obtained by the process according to the invention, which makes it possible to obtain a loading rate that can go up to 45 kg of COD/$m^3$.day against a maximum 20 kg of COD/$m^3$.day for the conventional fixed beds.

To the extent that the industrial sizings are proportional to the loading rate, the process according to the invention therefore makes possible a large reduction of the space occupied by the equipment.

Thus, in the process according to the invention, once run-up is ended and once the reactor operates in a fixed bed, the reactor primarily makes possible retention by accumulation of the biomass, in addition the conventional formation of a biofilm. Retention of the biomass is defined as its accumulation in the openings of the supports and/or between the supports.

Actually, in a fixed bed, the formation of biofilm leads to a reduction of the specific surface area and the activity of the biomass because of the covering of the supports by successive layers of biofilm. These successive coverings can explain the limitation of loading rates on the conventional fixed beds.

In the invention, the backwashing system makes it possible to evacuate the excess biomass that accumulates in the layer of supports. The "retention of the biomass" effect by filtration is linked to the size, to the shape, to the hydrodynamics of the supports as well as to the use in a fixed bed of the reactor. This is therefore different from the so-called conventional biofilters that make the retention possible by a stacking of supports and not by the supports themselves.

The invention claimed is:

1. A purification process for purifying effluent in an anaerobic reactor in which the microorganisms are retained by supports, whereby the supports form a fixed bed in a portion of the reactor, said purification process comprises the following stages:
    a) running the reactor up by decoupling a loading rate and a hydraulic dwell time (HDT) in such a manner so as to gradually increase an applied charge until reaching a chemical oxygen demand (COD) of the effluent to be treated and so as to maintain the HDT to less than 48 hours;
    b) purifying the effluent by retaining and holding the supports in a fixed bed;
    c) fluidizing the reactor once it becomes at least partially clogged by temporary suspension of the supports.

2. The purification process according to claim 1, wherein the HDT is constant during stage a).

3. The purification process according to claim 1, wherein during stage a), the HDT is between 12 and 36 hours.

4. The purification process according to claim 3, wherein during stage a), the HDT is between 20 and 30 hours.

5. The purification process according to claim 4, wherein during stage a), the HDT is between 22 and 26 hours.

6. The purification process according to claim 5, wherein during stage a), the HDT is equal to 24 hours.

7. The purification process according to claim 1, wherein stage a) lasts for 36 days, plus or minus 5 days.

8. The purification process according to claim 1, wherein during stage a), the reactor is fluidized at least once by suspending supports.

9. The purification process according to claim 8, wherein the supports are temporarily suspended every hour.

10. The purification process according to claim 8, wherein the supports are in continuous suspension for the entire stage a).

11. The purification process according to claim 1, wherein stage b) lasts between 2 and 12 months.

12. The purification process according to claim 11, wherein stage b) lasts between 6 and 9 months.

13. The purification process according to claim 12, wherein stage b) lasts 8 months.

14. The purification process according to claim 1, wherein stage c) lasts between 15 minutes and 1 hour, plus or minus 10 minutes.

15. The purification process according to claim 1, wherein stages b) and c) are repeated n times.

16. The purification process according to claim 1, wherein the supports comprise attachment zones on which the microorganisms can be attached, whereby the attachment zones are arranged so as to allow physical retention of said microorganisms, the attachment zones comprising flanges, whereby the microorganisms can be attached to said flanges and/or retained in openings between the flanges and/or between the supports.

17. The purification process according to claim 1, wherein the supports occupy between 40% and 80% of the volume of the reactor.

18. The purification process according to claim 17, wherein the supports occupy between 50% and 70% of the volume of the reactor.

19. The purification process according to claim 1, further comprising the stage of:
    actuating a fluidization system that creates turbulence inside the reactor so as to suspend the supports.

20. The purification process according to claim 19, wherein the fluidization system is a removable external system, whereby said system is branched at least temporarily over at least one duct that empties into an interior of the reactor to carry out backwashing.

* * * * *